(12) United States Patent
Crana

(10) Patent No.: US 6,409,948 B1
(45) Date of Patent: Jun. 25, 2002

(54) PROCESS AND APPARATUS FOR THE PRODUCTION OF EXPANDED POLYESTER, IN PARTICULAR PET

(75) Inventor: Renato Crana, Turin (IT)

(73) Assignee: B.C. Foam S.r.l., Turin (IT)

( * ) Notice: Subject to any disclaimer, the term of this patent is extended or adjusted under 35 U.S.C. 154(b) by 0 days.

(21) Appl. No.: 09/436,754

(22) PCT Filed: May 9, 1998

(86) PCT No.: PCT/EP98/02648
§ 371 (c)(1),
(2), (4) Date: Jan. 10, 2000

(87) PCT Pub. No.: WO98/51467
PCT Pub. Date: Nov. 19, 1998

(30) Foreign Application Priority Data

May 5, 1998 (IT) ............................. T097A0394

(51) Int. Cl.[7] ......................... B29C 44/20; B29C 44/46
(52) U.S. Cl. ............................. 264/50; 264/51; 264/53; 425/4 C; 425/208; 425/325
(58) Field of Search ................ 425/4 C, 208, 425/325; 264/51, 53, 54, 50

(56) References Cited

U.S. PATENT DOCUMENTS

| | | | |
|---|---|---|---|
| 3,252,182 A | * 5/1966 | Colombo | 366/83 |
| 3,843,757 A | * 10/1974 | Ehrenfreund et al. | 264/54 |
| 4,409,167 A | * 10/1983 | Kolouch et al. | 264/102 |
| 4,892,691 A | 1/1990 | Kolossow | |
| 5,000,991 A | * 3/1991 | Hayashi et al. | 264/54 |
| 5,234,640 A | * 8/1993 | Amano et al. | 264/54 |
| 5,422,381 A | * 6/1995 | Al Ghatta et al. | 521/182 |
| 5,458,832 A | * 10/1995 | Kabumoto et al. | 264/51 |
| 5,510,073 A | * 4/1996 | Kaegi et al. | 264/102 |
| 5,902,529 A | * 5/1999 | Ishikawa et al. | 264/51 |
| 6,013,360 A | * 1/2000 | Al Ghatta et al. | 428/220 |
| 6,054,500 A | * 4/2000 | Ghatta et al. | 264/46.1 |

FOREIGN PATENT DOCUMENTS

| | | |
|---|---|---|
| DE | 29507376 U | 6/1995 |
| EP | 0437094 A | 7/1991 |
| EP | 0547033 A | 6/1993 |
| EP | 0668139 A | 8/1995 |
| EP | 0719626 A | 7/1996 |
| GB | 1231535 A | 5/1971 |
| JP | 63064718 A | 3/1988 |
| JP | 06091725 A | 4/1994 |
| JP | 08132513 | 5/1996 |
| WO | WO 8808013 A | 10/1988 |
| WO | WO 9312164 A | 6/1993 |
| WO | WO 9715627 A | 5/1997 |

OTHER PUBLICATIONS

"Jungste Fortschritte auf dem Gebiet Compoundierens mit Doppelschneckenextrudern", by John Colbert, Kunststoffberater, May, 1992, No. 5, Isernhagen, Germany, 7 pages.

"The Geometry of Self–Cleaning Twin–Screw Extruders" by C. Rauwendaal, Advances in Polymer Technology, vol. 15, No. 2, pp. 127–133 (1996).

Kontinuierliche Aufbereitung neuer Werkstoffsysteme (Teil I) by Hock et al., Kunststoffberater, Mar. 1994, No. 3, Isernhagen, Germany, pp. 28–36.

"Doppelschnecken–Compoundierextruder mit hohem spezifischen Drehmoment" by A. Swanborough, Kunststoffberater 37 Oct. 1992, No. 10, Isernhagen, Germany, pp. 34–37.

* cited by examiner

Primary Examiner—Allan R. Kuhns
(74) Attorney, Agent, or Firm—Sughrue Mion, PLLC

(57) ABSTRACT

A process for the production of expanded polyester, in particular PET, is performed by extrusion of polyester starting material have an intrinsic vircosity of at least 0.8 dl/g and an added expanded agent. To this end a twin screw extruder (14) is utilized provided with two interpenetrating screws (26) having a ratio between their axial separation and diameter lying between 0.6 and 0.8 and co-rotating at a speed of between 15 and 40 rpm. Preferably the ratio between the axial separation and diameter of the screws (26) lies between 0.69 and 0.78 and the ratio between the length and diameter of the screws (26) lies between 20 and 26.

16 Claims, 3 Drawing Sheets

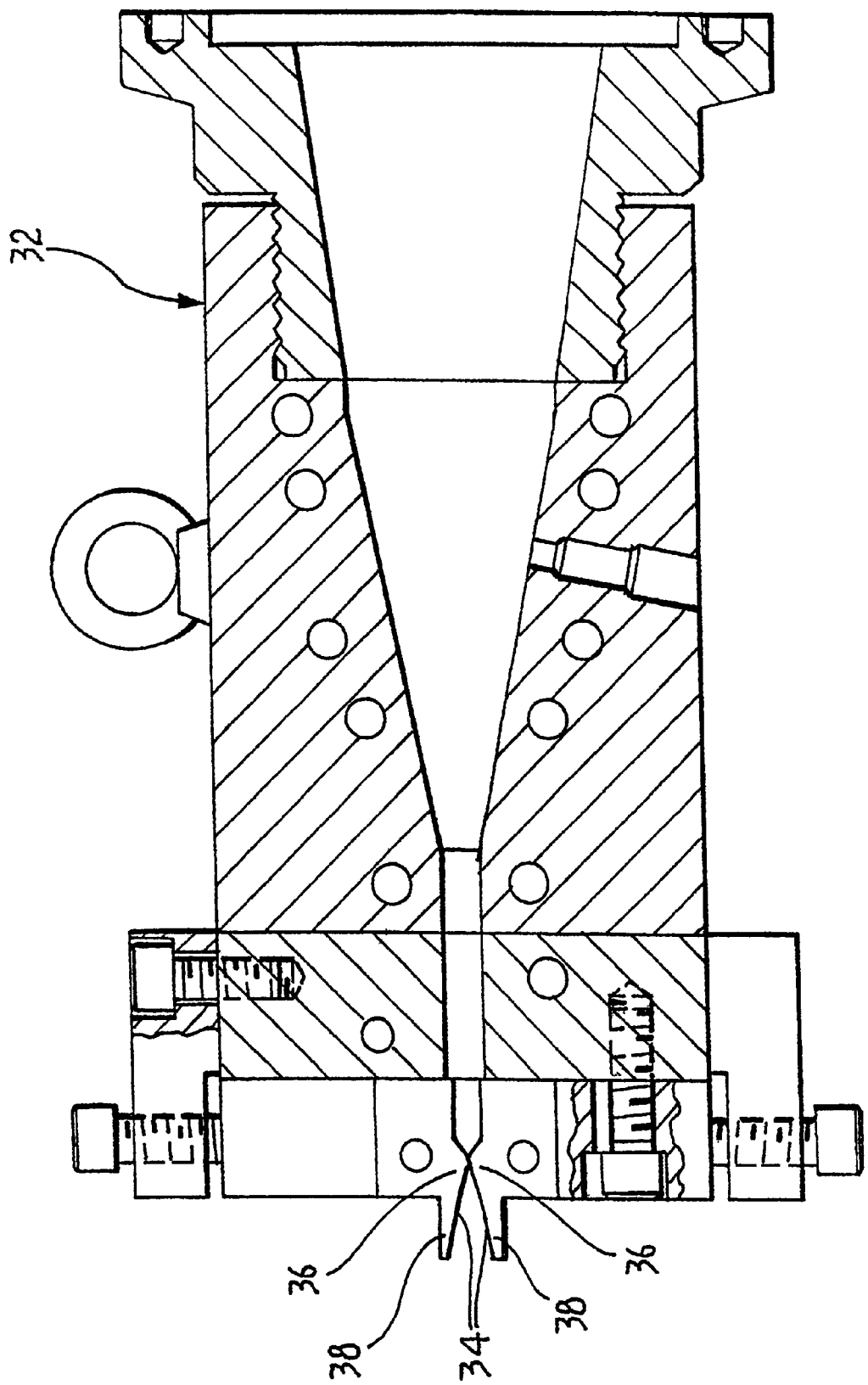

PROCESS AND APPARATUS FOR THE PRODUCTION OF EXPANDED POLYESTER, IN PARTICULAR PET

The present invention relates to a process for the production of expanded polyester, in particular PET for the production of articles such as, for example, panels, sheets and tubes, which can be used in particular in the building and packaging field.

The object of the present invention is to provide a process of the above indicated type which will allow the production of an expanded product of adequate characteristics for the above listed uses. This involves, in particular, obtaining a final product of density at least to 40 kg/m$^3$, uniform cellular structure of fine cells, and without degradations evidenced by reductions in molecular weight and viscosity with respect to the starting product, which are due for example to possible hydrolysis reactions.

According to the invention this object is achieved by a process and apparatus for its performance having the characteristics specifically set out in the following claims.

BRIEF DESCRIPTION OF THE DRAWINGS

Further advantages and characteristics of the present invention will become apparent from the following detailed description, provided purely by way of non-limitative example, with reference to the attached drawings, in which;

FIG. 3 is a section on an enlarged scale of the nozzle of the extruder of the apparatus of the invention.

DETAILED DESCRIPTION OF THE INVENTION

Figure 1:
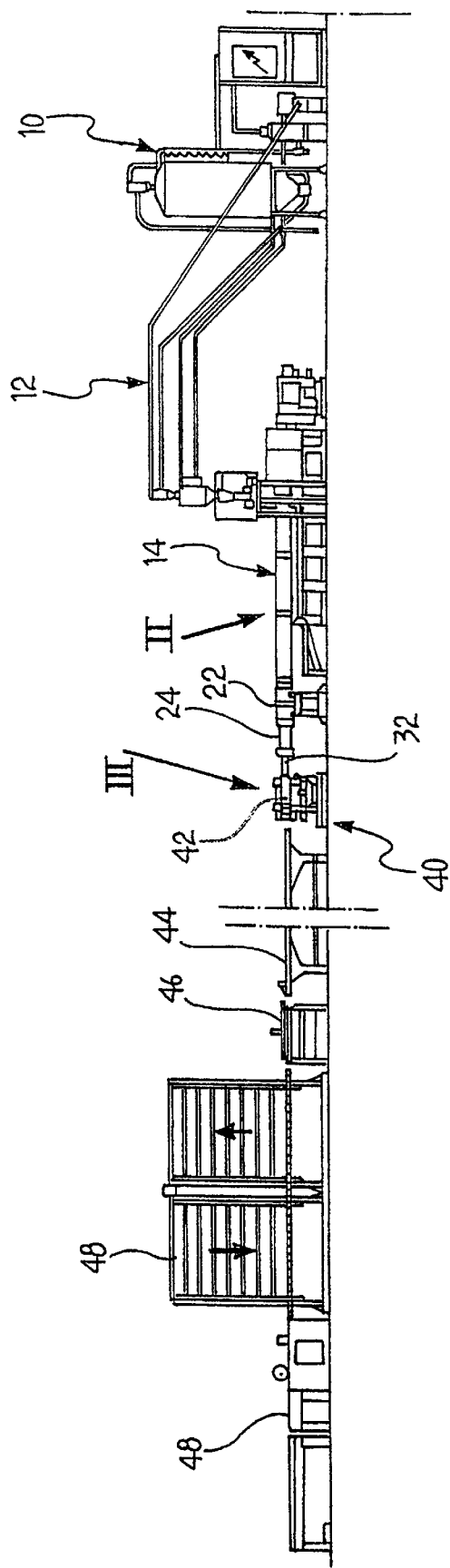
FIG. 1 is a schematic side view of apparatus for performing the process of the invention.

Apparatus for the production of expanded polyester comprises (FIG. 1) a drier 10 of polyester starting material and a conveyor device 12 for conveying this latter to an extruder 14. Both the drier 10 and the conveyor device 12 are known per se and therefore will not be described in detail herein.

The extruder 14 has a tubular body 16 with an internal cavity in which there can be distinguished, in succession, a polyester feed and melting zone 18 and a cooling and homogenisation zone 20 comprising a static heat exchanger 22 and a homogeniser 24.

In the feed and melting zone 18 the body has apertures not shown in the drawings for the introduction of polyester starting material and an expanding agent.

In the cavity of the feed zone 18 are located two interpenetrating and co-rotating screws 26 with a ratio of axial separation (i.e. the distance between the respective central lines) to diameter lying between 0.6 and 0.8, and preferably between 0.69 and 0.78, and a length to diameter ratio lying between 20 and 26.

Figure 2:
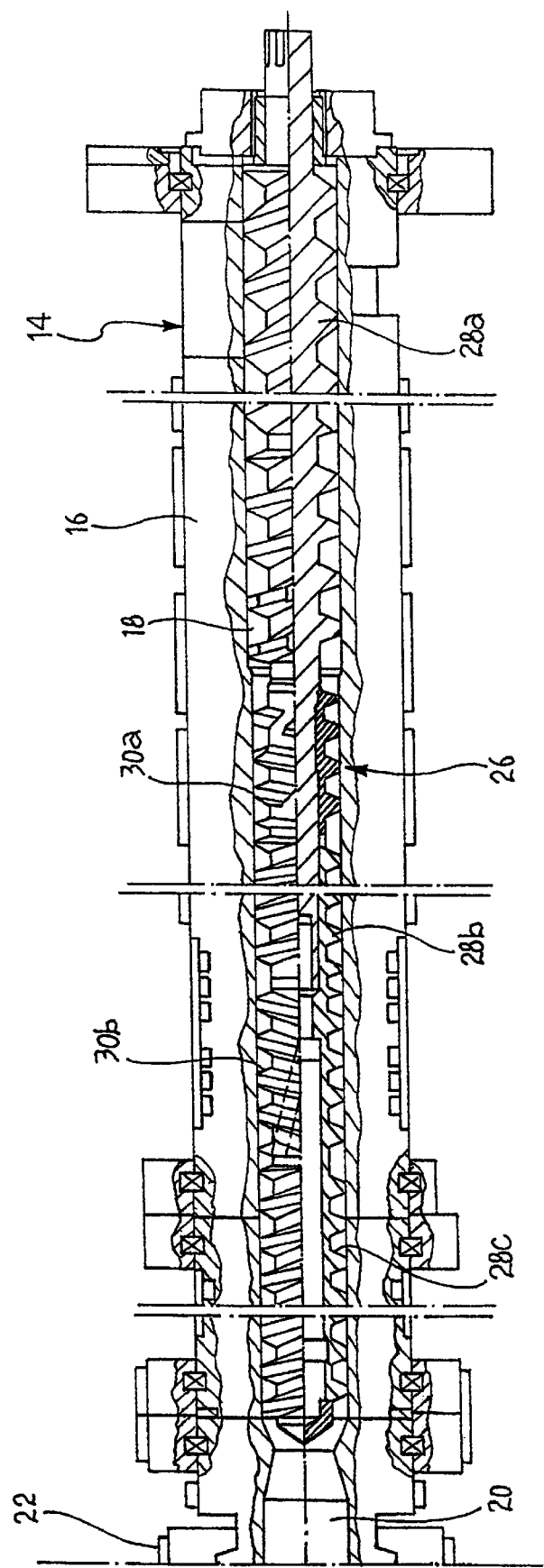
FIG. 2 is a sectional view on an enlarged scale of a detail of the extruder of the apparatus of the invention.

Each screw 26 comprises (FIG. 2) three conveyor sections 28a, 28b, 28c separated from one another by two back mixing sections 30a, 30b.

Downstream from the cooling and homogenisation section 20 of the extruder 14 is located a nozzle 32 which (FIG. 3) has two facing lips 34 having a rectilinear profile in a direction transverse that of the extrusion so as to define a rectangular extrusion orifice which causes the formation of a laminar extruded product. Moreover the lips 34 have, in a direction parallel to that of the extrusion, a profile with a protuberance 36 facing the corresponding protuberance 36 of the opposite lip 34 and joined to the exit edge 38.

Downstream from the nozzle 32 (FIG. 1) is located a calibration device 40 for calibrating the thickness of the extruded product, comprising a pair of belts 42 rotating in closed loops and having respective facing sides which define a space of adjustable height through which the product passes. Advantageously the belts 42 are of glass wool clad in fluorated polymer and can be temperature regulated.

In a manner known per se,.downstream of the calibration device 40 there are further located a roller table 44 passing over which the extruded product can cool, a cutting device 46 and various finishing and preparation tools 48 for storage of the cut extruded product.

The operation of the apparatus just described is as follows.

A polyester starting material having an intrinsic viscosity of at least 0.8 dl/g, preferably at least 0.9 dl/g, is transferred by means of the conveyor device 12 from the drier 10 to the feed zone 18 of the extruder 14 at the first conveyor section 28a of the screws 26.

Advantageously the polyester starting material is obtained by polycondensation of an aromatic bicarboxylic acid, such as terephthalic acid, isophthalic acid or naphthalene dicarboxylic acid, with a diol such as ethylene glycol, tetramethylene glycol, cyclohexane dimethanol or 1,4-butanediol, in the presence of various possible additives (chain extenders, stabilisers, nucleating agents and fireproofing agents) known in the art. The preferred starting material is in particular PET.

It is intended that the intrinsic viscosity is determined according to the ASTM D 4603-86 regulations on solutions of 0.5 g of granular polyester in 100 ml of a 60/40 mixture by weight of phenol and tetrachloroethane at 25° C.

An expanding agent is fed in at the second conveyor section 28b of the screws 26. This latter agent can be any of those commonly used in the production of expanded plastics materials. For example it can be chosen from the group comprising inert gases (in particular carbon dioxide and nitrogen), aliphatic, cycloaliphatic and aromatic hydrocarbons, and partially or completely halogenated hydrocarbons (CFC, HCFC, HFA).

The temperature of the polyester with added expanding agent in the feed and melting zone lies between 280° C. and 310° C. whilst in the cooling and homogenisation zone it lies between 220° C. and 280° C. The screws 26 are made to rotate at a relatively low speed lying between 15 and 40 rpm.

After a residence time of between 15 and 30 minutes in the extruder, the polyester with added expanded agent is extruded through the orifice of the nozzle 32 in the form of a laminar product having a density lying between 40 and 200 kg/m$^3$ and an intrinsic viscosity substantially unchanged with respect to that of the starting material.

These characteristics are optimal in view of the uses to which the extruded product is intended to be put and are obtained thanks in particular to the shape and the manner of rotation of the screws which do not impart damaging stresses to the melt which could compromise its physical and chemical properties.

The thickness of the extruded product can then be regulated to the desired value following passage through the calibration device 40. The extruded product, translating on the roller table 44, then cools until it assumes a consistency such that manipulations to which it is subsequently subjected do not damage it.

It can thus be cut into the desired dimensions by the device 46 and finally be finished and prepared for storage and transport by the various tools 48.

Naturally, the principle of the invention remaining the same, the details of construction and embodiments can be widely varied with respect to what has been described and illustrated in the drawings, without by this departing from the ambit of the present invention.

What is claimed is:

1. A process for production of expanded polyester by means of extrusion from a twin screw extruder (14) of a polyester starting material having an intrinsic viscosity of at least 0.8 dl/g and an added expanding agent, the said process being characterised in that said twin screw extruder (14) is provided with two inter-penetrating screws (26) having a ratio between axial separation and diameter lying between 0.6 and 0.8 and co-rotating at a speed lying between 15 and 40 rpm, wherein that the length-to-diameter ratio of the screws (26) lies between 20 and 26.

2. A process according to claim 1, characterised in that the ratio between axial separation and diameter of the screws (26) lies between 0.69 and 0.78.

3. A process according to claim 1 wherein the polyester is PET.

4. A process according to claim 1, characterised in that said extruder (14) has, in succession, a feed and melting zone (18) in which the polyester is held at a temperature lying between 280° C. and 310°, and where the said screws (26) are located, and a cooling and homogenisation zone (20) in which the polyester is held at a temperature lying between 220° C. and 280° C.

5. A process according to claim 4, characterised in that the said cooling and mixing zone (20) includes a static heat exchanger and a homogeniser.

6. A process according to claim 1, characterised in that each of the said screws (26) comprises three conveyor sections (28a, 28b, 28c) separated from one another by two back mixing sections (30a, 30b).

7. A process according to claim 6, characterised in that the feed of polyester resin takes place at the first conveyor section (28a) whilst the feed of expanding agent takes place at the second conveyor section (28b).

8. A process according to claim 1, characterised in that the polyester with added expanded agent is extruded through a nozzle (32) positioned at the exit end of the extruder (14), the said nozzle (32) having two facing lips (34) of rectilinear shape in a direction transverse the extruding direction so as to define a rectangular extrusion orifice which causes the formation of an extruded sheet product having a density lying between 40 and 200 kg/m$^3$.

9. A process according to claim 8, characterised in that the said lips (34) have, in a direction parallel to the extruding direction, a shape with a protuberance (36) facing the corresponding protuberance (36) of the opposite lip (34) and joined to the exit edge (38).

10. A process according to claim 1, characterised in that the said extruded sheet product is made to pass through a calibration device (40) allowing its thickness to be regulated.

11. A process according to claim 10, characterised in that the said calibration device (40) comprises a pair of belts (42) rotating in closed loops and having respective facing sides defining a space of adjustable height through which the sheet product passes.

12. A process according to claim 11, characterised in that the said belts (42) are of glass wool clad in fluorinated polymer.

13. A process according to claim 1, characterised in that the said polyester resin having an intrinsic viscosity of at least 0.8 dl/g is obtained by polycondensation of an aromatic bicarboxylic acid, which is terephthalic acid, isophthalic acid or naphthalene dicarboxylic acid, with a diol, which is ethylene glycol, tetramethylene glycol, cyclohexane dimethanol or 1,4-butanediol.

14. A process according to claim 1, characterised in that the said expanding agent is selected from the group consisting of inert gases, aliphatic, cycloaliphatic and aromatic hydrocarbons, and partially or completely halogenated hydrocarbons.

15. A process according to claim 1, characterised in that the residence time of the resin in the extruder (14) lies between 15 and 30 minutes.

16. An apparatus for the production of expanded polyester comprising extrusion means, said apparatus being characterised in that said extrusion means consists of a single twin extruder provided with two interpenetrating screws having a ratio between axial separation and diameter lying between 0.6 and 0.8 and co-rotating at a speed lying between 15 and 40 rpm, said extrusion means including a nozzle having two facing lips of rectilinear shape in a direction transverse to the extruding direction so as to define a rectangular extrusion orifice which causes the formation of a sheet extruded product, a calibration device is located downstream of the nozzle through which the extruded sheet product is made to pass allowing its thickness to be regulated, said calibration device comprising a pair of belts comprised of glass wool clad in fluorinated polymer rotating in closed loops and having respective facing sides defining a space of adjustable height through which the sheet product passes.

* * * * *

UNITED STATES PATENT AND TRADEMARK OFFICE
CERTIFICATE OF CORRECTION

PATENT NO. : 6,409,948 B1
DATED : June 25, 2002
INVENTOR(S) : Renato Crana

It is certified that error appears in the above-identified patent and that said Letters Patent is hereby corrected as shown below:

<u>Title page,</u>
Item [22], should read:

-- [22]  PCT Filed:     May 5, 1998 --

Signed and Sealed this

Twenty-ninth Day of July, 2003

JAMES E. ROGAN
*Director of the United States Patent and Trademark Office*